April 17, 1962  E. W. ZEARFOSS, JR  3,029,609
FREEZING APPARATUS
Filed June 29, 1959  3 Sheets-Sheet 1

INVENTOR.
ELMER W. ZEARFOSS, JR.
BY
F D Prap
ATTORNEY

April 17, 1962 E. W. ZEARFOSS, JR 3,029,609
FREEZING APPARATUS
Filed June 29, 1959 3 Sheets-Sheet 2

INVENTOR.
ELMER W. ZEARFOSS, JR.
BY
F. D. Prage
ATTORNEY

April 17, 1962 — E. W. ZEARFOSS, JR — 3,029,609
FREEZING APPARATUS
Filed June 29, 1959 — 3 Sheets-Sheet 3

INVENTOR.
ELMER W. ZEARFOSS, JR.
BY
F. D. Prag
ATTORNEY

United States Patent Office 3,029,609
Patented Apr. 17, 1962

3,029,609
FREEZING APPARATUS

Elmer W. Zearfoss, Jr., Philadelphia, Pa., assignor, by mesne assignments, to Philco Corporation, Philadelphia, Pa., a corporation of Delaware
Filed June 29, 1959, Ser. No. 823,566
2 Claims. (Cl. 62—135)

This invention relates to ice makers, particularly of a type which is suitable for use in domestic refrigerators, freezers or the like.

An ice maker of such general type has been disclosed in Patent 2,407,058 of H. W. Clum, assigned to the assignee of this application, and the new application, in one aspect thereof, is an improvement over the Clum apparatus. The apparatus described in said patent utilizes a double and reversible tray, arranged so as to place one series of tray elements or ice cube receptacles in upwardly facing position when another such series faces straight down. The upwardly facing receptacles are filled with water. So long as such water is above freezing temperature, a certain amount of heat is derived therefrom, which flows through the walls of the double tray, and this causes previously frozen ice cubes to drop from the downwardly facing tray receptacles.

Apparatus of such type has a number of advantages, mainly in domestic use. For instance it simplifies the construction of the freezing unit, in that it requires no connection of electrical power lines to said unit, it being unnecessary to employ any reverse-cycle controls or electrical heating devices in said unit. The Clum construction also avoids any and all operations of forcible and vibratory character and which are likely to create bothersome noise, such as the breaking out of ice cubes by mechanical force.

However, it has now been found that further advantage can be gained and that particularly the releasing of ice blocks can be made more rapid and more reliable. This becomes possible when the arrangement is no longer such that the ice block must drop from a mold facing straight down, like a cake from a form, but when, instead, provision is made for the freezing and subsequent partial thawing of semicylindrical, hemispherical or similar ice blocks (known as such) and for a gravitational movement of such blocks, with rotary shearing action, resembling the action of a lubricated friction bearing. It is a primary object of the new invention to provide for such action, by means of novel form, arrangement and/or positioning of an ice tray or mold.

Figure 1:
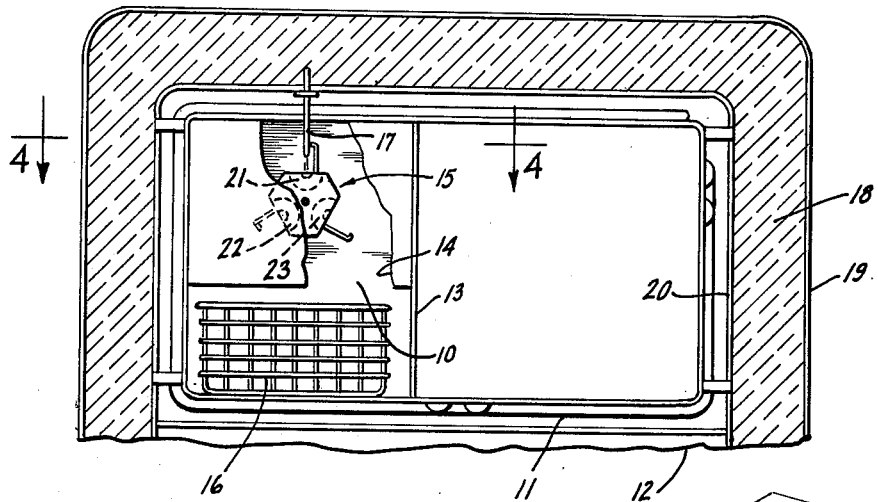
Figure 2:
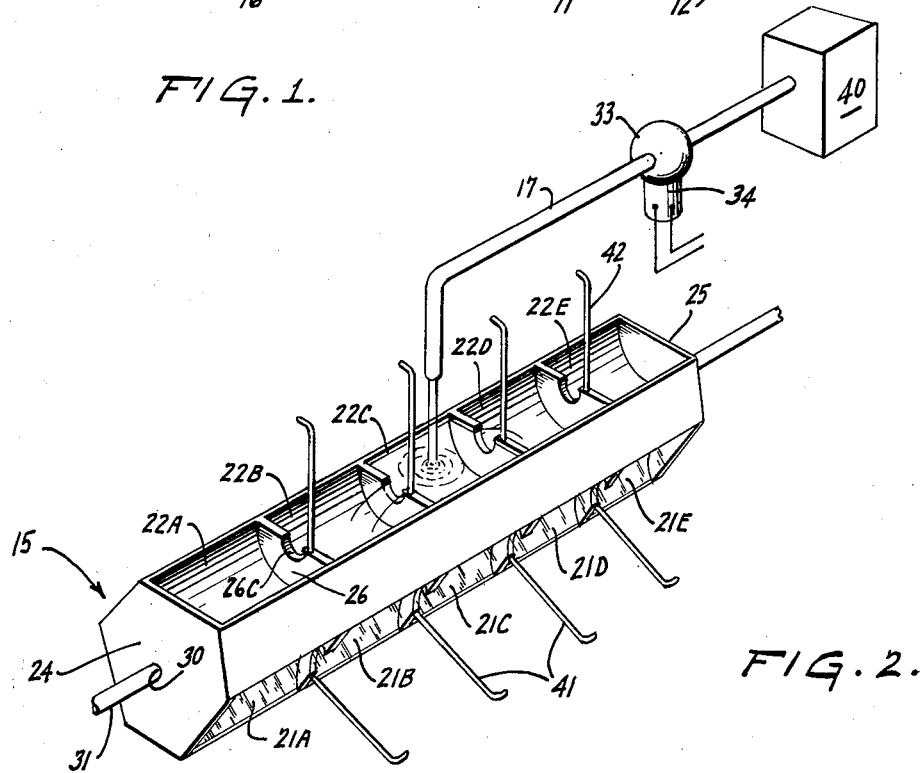
Figure 3:
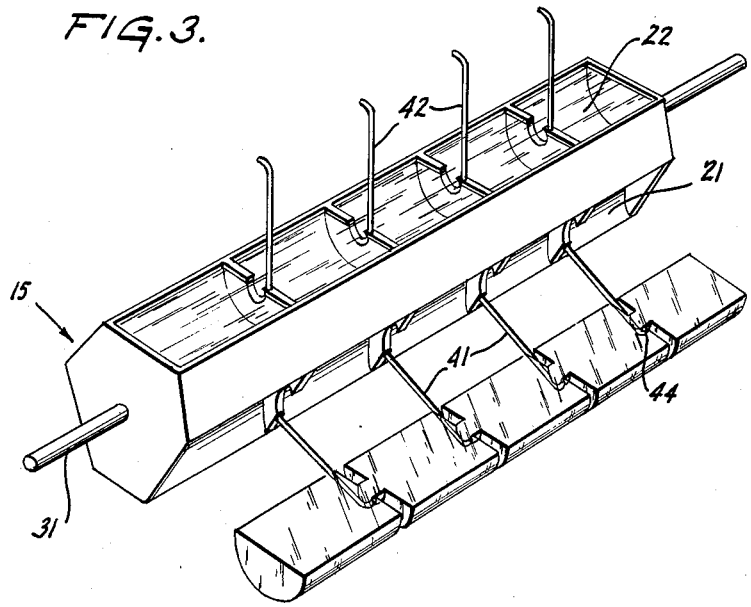
Figure 4:
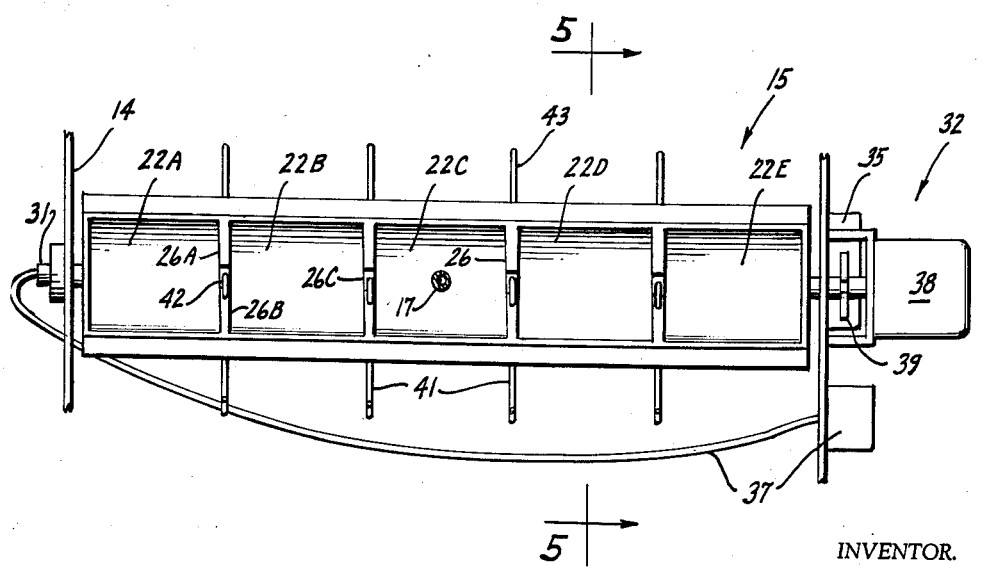
Figure 5:
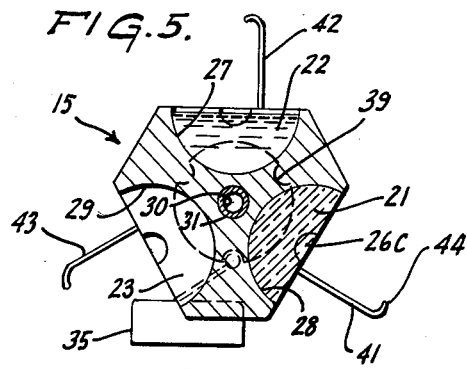
Figure 9:
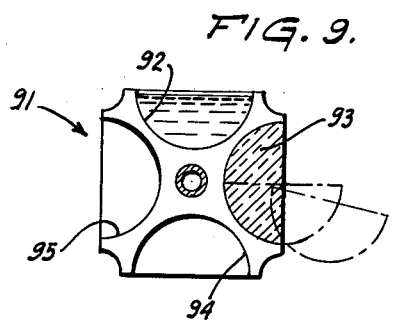
Figure 6:
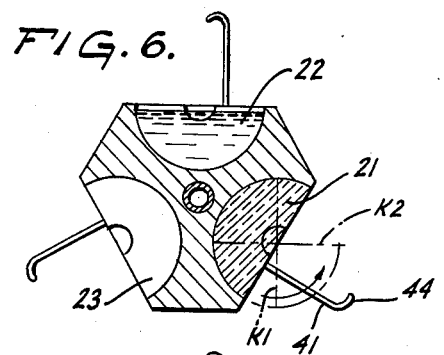
Figure 10:
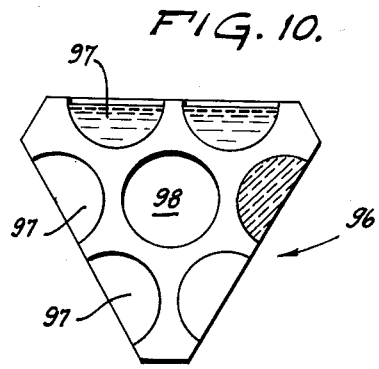
Figure 7:
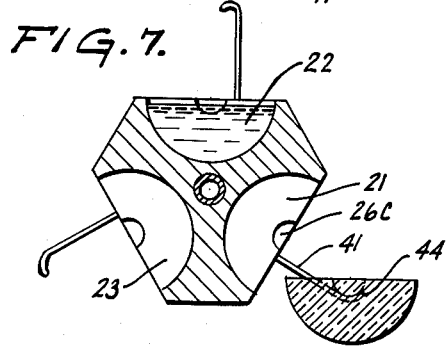
Figure 11:
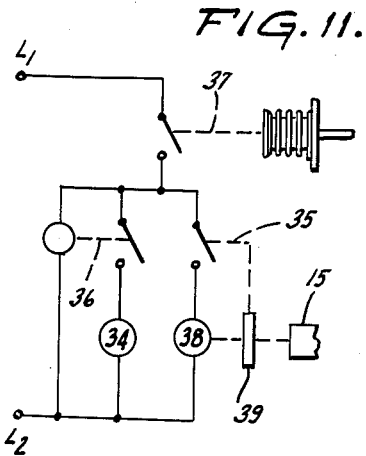
Figure 8:
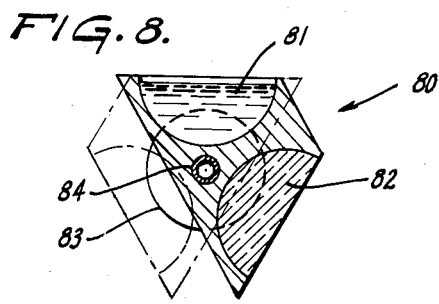

Other objects will be understood from the description which follows, wherein several embodiments of the invention will be explained. In the drawing: FIGURE 1 is a front view of a preferred embodiment of the invention. FIGURE 2 is a perspective view of the freezing mold unit of such apparatus and FIGURE 3 is a similar view of the same unit, in a different stage of operation thereof. FIGURE 4 is a plan view of the unit, looking in the direction of the line 4—4 in FIGURE 1. FIGURES 5 to 7 are sections taken along line 5—5 in FIGURE 4 and showing the unit in different stages of operation. FIGURES 8 to 10 are similar sections, taken through modified freezing mold units, FIGURES 8 and 10 being embodiments of the invention and FIGURE 9 being shown for comparison. FIGURE 11 is a circuit diagram for apparatus in accordance with the invention.

As shown in FIGURE 1, ice maker compartment 10, formed in evaporator 11 of refrigerator 12 by partition 13, has a structure 14 in an upper portion thereof which supports a novel, intermittently rotatable mold block or unit 15. Below this new unit 15, a lower portion of the same compartment 10 contains a conventional, removable, normally stationary basket or pail 16 for harvesting the ice blocks discharged from such unit 15. A pipe 17 leads to unit 15, through insulation 18 between outer and inner shells 19, 20 of the refrigerator, for periodically filling compartments of unit 15 with water.

The mold block or unit 15 is made of thermally conductive material, such as aluminum, and is constructed in novel form and arrangement. As illustrated, it has three trays or rows 21, 22, 23 of outwardly open molds, receptacles or cups, said rows being uniformly angularly spaced from each other so that the unit presents, in front end view, a regular polygonal form derived from an equilateral triangle by the use of blunt design of corner portions.

Each row 21, etc. comprises, as shown in FIGURES 2 and 3, a series of molds, receptacles, or cups 21A, 21B, etc.; 22A, 22B, etc. Such molds are disposed between end walls 24, 25 of the unit and each mold is separated from the next by a partition 26. As best shown in FIG. 5, the principal boundary wall 27, 28 or 29 of each mold or cup, extending between ends 24, 25, has smooth, arcuate curvature, covering substantially one-half or at least not appreciably more than one-half of a circle. Ice blocks or "cubes" of advantageous form can be made in such cups and, importantly, the harvesting of ice blocks is greatly facilitated by using the substantially semicircular curvature as described, in combination with particular orientations of the molds, to be described presently.

Parallel to and centrally between the three rows of compartments, mold unit 15 has an elongate bore or aperture 30, wherein a metal tube 31 is inserted to provide a pivot means for said unit. The tube is shown as extending through and beyond both ends of the mold unit and (FIGURE 4) as being supported by structure 14. A motor and control unit 32 serves to intermittently, angularly move and selectively to position the mold unit, on this pivot means, as will now be described.

Normally, unit 15 is at rest, in a position such as that shown in FIGURES 1 and 2, that is, with one of the rows of ice molds, for instance row 22, upwardly presented. Initially, the successive molds of this row are filled with water, which at this stage is above freezing temperature and which is admitted by pipe or spigot 17 under the control of a valve 33 (FIGURE 2). The valve preferably has a metering orifice, not shown, and is opened by a solenoid mechanism 34 under the control of cam switch 35 in unit 32 (FIGURES 4 and 5). All molds of the upwardly presented row are thus filled with water; it being preferred to provide each partition 26 with a groove or weir notch 26C, formed in a central portion of the outer or edge area of the partition, to provide passages for the filling of successive molds by a single spigot 17. At or about the time when the required quantity of water has been admitted, which usually is the case after a few seconds, a timing and/or switching element 36 in control mechanism 32 (FIGURE 11) operates electrical mechanism 34 (FIGURE 2) to close fill-valve 33, said valve being provided with suitable pressure regulating means, not shown. The water in molds 22A, 22B, etc. is then exposed to the low temperatures maintained by evaporator 11 (FIGURE 1), and is gradually frozen into solid ice blocks.

A conventional, well known thermostatic bulb and switching element 37 (see FIGURES 4 and 11) is associated with pivot tube 31 and control unit 32, so as to initiate rotary displacement of tray unit 15 when all of the water in the upwardly exposed molds has thus been frozen. Motor 38 of control unit 32 then rotates mold structure 15, together with a cam 39 (FIGURES 4 and 5). When cam and molds have been rotated through the angle of 120 degrees, included between the orientations of a pair of sides in the equilateral unit 15, cam switch 35 stops motor 38 and energizes solenoid 34 to open the fill-valve (FIGURE 11), thereby re-establishing the initial position but with a new row 22 upwardly presented (as shown in FIGURES 2–7).

The fill-valve system can generally be connected to the city water supply, to introduce water of more or less moderate temperature into the upwardly facing molds. It is however sometimes desirable either to expose substantial length of pipe 17, outside the refrigerator, to room temperature, or for instance to incorporate a vessel 40 (FIGURE 2) in pipe 17, wherein water temperatures can, if necessary, be raised in any desired way. In either case the water which enters the upper part of mold unit 15 (FIGURE 5) and which at the time of admission is above freezing temperature, raises the temperature of the entire, heat-conductive mold unit, thereby tending to thaw the previously formed ice blocks out of their molds, which are now oriented in downwardly and laterally facing position.

When such thawing has continued for some time (usually a few minutes, when water at room temperature is used), gravity causes the entire row of ice blocks to slide angularly in the corresponding row of molds, as shown in FIGURE 6 at positions K1, K2. This gravitational, angular sliding is now allowed since the peripheral ice block surfaces are no longer subject, as they were until then, to solid adhesion or bonding thereof to the corresponding walls of the mold. The blocks therefore tend to turn about the center of rotary motion which they are now free to perform. Several details of this rotary motion will be explained hereinafter; at this point it suffices to say that the blocks now turn, due in substance to their own weight, and that their motion is similar to that in which a shaft element turns in a lubricated bearing. Lubrication is actually provided by melt water in the mold.

Only a few moments are normally required for performing the entire slidable turning of the ice blocks, provided according to the invention. The reason for the rapidity of the action is that in this process the ice blocks move along, not away from the walls of their molds, so that the force of gravity, derived from the weight of the ice blocks themselves, must overcome substantially no suction but only such resistive forces as are occasioned by the shear resistance of a thin film of melt water, formed around the ice blocks.

In this respect, the invention differs radically from the former arrangement, wherein an ice block had to drop out of, not to slide along, the adjacent walls of a mold. In the former arrangement, the force of gravity had to create a partial vacuum, against atmospheric pressure, in addition to the necessity of overcoming a shear resistance of liquid on the sides of the mold. In such former arrangement, accordingly, the block fell out of the mold only when the shear resistance had become insignificant, that is, after prolonged melting. According to the invention, as shear resistance is substantially the only effective force to be overcome, much lesser time and heat input for melting is required.

The rotary type of ice block release, as described, is facilitated by the feature that the interconnecting grooves 26C are of semicircular form, concentric with the curved walls 27, 28 or 29, so that ice connectors, forming in said grooves, do not interfere with the angular sliding process. Partitions 26 may have a slight taper, so that the cups discharge readily in downward directions.

Within a very short time interval, accordingly, the blocks as gravitationally manipulated in accordance with the invention reach their lowermost position, allowed by the curvature of the mold cups, as shown by broken lines K1, K2 in FIGURE 6. Thereupon, at most a relatively small portion of each block is still in contact with the mold. The net effect of shear resistance, opposing further sliding motion of the ice block, is thus reduced to a relatively small value. Furthermore, such parts of arcuate surfaces of ice blocks and ice molds as are still in mutual engagement are oriented in at least partly downward directions. As a result of these conditions the ice blocks now slide downwardly out of the molds, still moving at least approximately along the arcuate surfaces. The mold is thus emptied of ice, substantially without creation of any partial vacuum.

Even during the final stage of this harvesting operation, the ice blocks are preferably not discharged in a free fall; they are first intercepted by drying rack members. As more fully described in a copending application, filed by Holland S. Lippincott on June 29, 1959, Serial No. 823,695, now Patent No. 2,968,168, assigned to the assignee hereof, provision is made for systems 41, 42, 43 of drying rack members, one system for each row 21, 22, 23 of molds and intermittently rotatable therewith. The blocks from row 21 slide along rack elements 41 and are intercepted, at the end thereby, by hook elements 44 provided at said end, which elements engage the aforementioned ice connectors, as shown in FIGURES 3 and 7. While suspended on hooks 44 of racks or guides 41, the ice blocks are exposed to the low temperature of freezing compartment 10 and are accordingly dried by re-freezing of melt water adhering to their surfaces.

During the same cycle of operation, new ice blocks are frozen in the new upwardly exposed row 22 of ice molds. This leads in due course to renewed operation of thermostatic bulb and switch 37 and renewed operation of motor 38, to rotate mold unit 15 and cam 39 by 120 degrees (FIGURE 11) and thus to bring row 23 to the top. The renewed turning also causes drying rack 41 and hooks 44 (FIGURE 7) to lose contact with the ice blocks previously supported thereby, thus allowing the bolcks, which are now dry, to fall into basket 16 (FIGURE 1). Such free fall of the blocks is in some cases sufficient to break the ice connector trunnions and thus to produce individual, small, semicylindrical ice blocks.

In the modified embodiment of FIGURE 8 an ice maker mold unit 80 is used which comprises only two molds 81, 82. This embodiment omits one of the three molds, provided according to FIGURES 5 to 7 and which is more or less idle, in each position of those figures, except that it provides a second chance for thermal release, in the event that a first filling operation, for one reason or another, has failed to effect such release.

Each mold 81, 82 of the unit of FIGURE 8 has a curved mold surface, of form and arrangement similar to those defined above; and the double mold unit can be caused intermittently or reciprocatingly to perform a rotary motion, either by hand or automatically. For this purpose the unit includes suitable mechanism 83. It also has a central structure 84 which may resemble the tube 31 of FIGURES 2 to 7.

Incident to such reciprocating or rocking operation the mechanism alternately occupies the positions shown in full and broken lines, whereby it slidingly discharges ice blocks with either rightward or leftward component. Such alternating discharge is advantageous for the purpose of filling the underlying storage receptacle 16 (FIGURE 1) to the greatest possible extent, within the smallest overall space for the entire installation.

In the further construction, shown in FIGURE 9 for comparison, mold unit 91 comprises four molds 92, 93, 94 and 95, oriented at 90 degrees to one another, while according to FIGURE 10, mold unit 96 comprises three pairs of molds 97, which pairs are oriented to face in directions angularly spaced by 120 degrees. A central area 98 is suitably hollowed out, for installation of a center structure similar to tube 31 of FIGURES 2 to 7, and also for minimizing the amounts of heat, required to be added or subtracted during the successive heating and cooling cycles. In the direction of the axis of central space 98, the devices of FIGURES 9 and 10 may provide either one, or several, semicylindrical or hemispherical compartments, on each side of the mold unit or block. A central space 98 or 84 or 31 can also be utilized to supplement and/or effect the required cooling and heating operations, for instance by inserting reverse-cycle refrigerant passage means (not shown) in such a space, as will readily be understood by persons skilled in the art.

Receptacles of such forms as described above have heretofore been known, as such; however the method of and means for obtaining sliding and shearing release, as disclosed herein, are believed to be new. Greatly improved ice block harvesting, with substantially reduced need of heat input for surface melting, has been provided by these arrangements. This has been achieved mainly by the feature that the orientation of the ice block discharging mold is lateral and only partially downward according to 8 and FIGURES 5 to 8 and purely lateral according to FIGURE 9.

It will finally be seen that, when a plurality of molds are rigidly united into a mold unit and when at least one mold is held in straight upwardly facing position (FIGURES 5 to 10), a 60-degree lateral component of orientation of the other mold corresponds to a 120-degree spacing of mold orientations. More generally, the use of some lateral component L, in such arrangement, corresponds to a spacing of molds by 180 degrees minus L. Thus it is possible to express the principal feature of the new mold arrangement either in terms of mold orientation relative to a vertical line or in terms of angular spacing between mold orientations.

While a few embodiments of the invention have been described, it should be understood that details thereof are not to be construed as limitative of the invention, except insofar as is consistent with the scope of the following claims.

I claim:

1. An ice block producer comprising at least two ice molds of generally semicylindrical form, integrally and rigidly combined in such a way that when one of said ice molds faces vertically upwardly, another has its lower inside surface portions sloping toward its then lower edge in lateral and slightly downward directions; means for so turning said ice molds as to successively hold different ones of them facing vertically upwardly; and means for filling an ice mold when so facing upwardly, with water to provide for the freezing of an ice block in the ice mold facing upwardly, while promoting thermal release of a so frozen ice block from the other ice mold, the contour and position of the mold assuring substantially rotary sliding motion of the block along the inside surface portions of said mold, which motion carries the block partially out of the mold and then into substantially lateral and somewhat downward motion along said slopping surface portions to complete said release.

2. Apparatus for harvesting an ice block from an ice cup which in vertical plane has a substantially semicircular interior outline and which cup is normally maintained in upwardly facing position, said apparatus comprising: means for angularly tilting said ice cup from said upwardly facing position into a position providing lateral and somewhat downward slope of the lower portion of said outline of the tilted ice cup toward the lower edge thereof; and means for thermally releasing the ice block from the cup when so tilted, whereby the released block readily slides out of the cup in successive, substantially rotary and lateral-downward motions, guided respectively by said semicircular interior outline and said lateral-downward slope of the lower portion thereof.

References Cited in the file of this patent

UNITED STATES PATENTS

| | | |
|---|---|---|
| 621,563 | Gilbert | Mar. 21, 1899 |
| 718,765 | Huxley | Jan. 20, 1903 |
| 771,265 | Patton | Oct. 4, 1904 |
| 1,398,351 | Williams | Nov. 29, 1921 |
| 1,868,070 | Newman | July 19, 1932 |
| 1,868,503 | Kennedy | July 26, 1932 |
| 1,995,124 | Kolster | Mar. 19, 1935 |
| 2,161,321 | Smith | June 6, 1939 |
| 2,212,405 | Rose | Aug. 20, 1940 |
| 2,259,066 | Gaston | Oct. 14, 1941 |
| 2,407,058 | Clum | Sept. 3, 1946 |
| 2,771,749 | Miller | Nov. 27, 1956 |
| 2,778,198 | Heath | Jan. 22, 1957 |